3,055,939
UNSYMMETRIC BIS-AMMONIUM SALTS
Chester J. Cavallito and Allan Poe Gray, Decatur, Ill., assignors to Irwin Neisler and Co., Decatur, Ill., a corporation of Illinois
No Drawing. Filed June 3, 1957, Ser. No. 663,311
6 Claims. (Cl. 260—567.6)

The present invention relates to unsymmetric bis-quaternary ammonium salts.

The invention resides in the concept of a composition of matter having a molecular structure wherein a polycarbon lower-alkane is substituted on different carbon atoms by: (a) one onium-N-attached quaternary ammonium moiety having a radical weight excluding the anion, not in excess of about 117 in which the onium-N-substituents are three lower-aliphatic groups of which two can be joined to form a ring which can contain a hetero linking atom, and in which the electrostatic charge of said quaternary ammonium moiety is satisfied by the presence of an anion, and, (b) a second onium-N-attached quaternary ammonium moiety in which the onium-N- is substituted by an aralkyl group having a radical weight between about 105 and 320, and in which the remaining valences of the nitrogen of said quaternary ammonium moiety are satisfied by two lower-alkyl groups and an anion. The physical embodiments of this concept are solids having relatively high melting points and exhibit applied use characteristics in that they possess very unusual hypotensive activity of varying duration.

The complete molecule may be illustrated diagrammatically:

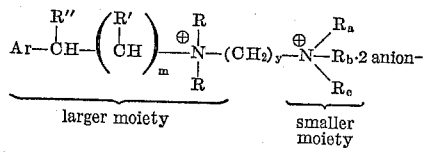

larger moiety     smaller moiety wherein:
Ar=aryl, unsubstituted or substituted with simple substituents
R=lower-alkyl (preferably methyl or ethyl)
R' and R''=hydrogen or lower alkyl
$m=0$ or 1
$y=2$-about 6
$R_a$, $R_b$, and $R_c$=three lower alkyl or lower-alkenyl groups, which are the same or different, or two of which are joined to form a heterocyclic radical, which may also include an oxygen atom or sulfur atom in addition to the onium-N.

As can be seen from the diagram any reference to the moieties is not intended to include the polycarbon lower-alkane bridge which joins the two moieties or the anions. The smaller moiety of the molecule consits of a cationic quaternary ammonium group and it is critical that the atoms of such moiety not exceed a total weight of about 117. The smaller moiety is made up of a quaternary nitrogen atom bearing substituents ($R_aR_bR_c$) such as three lower-alkyl or lower-alkenyl groups, which are the same or different; or, the moiety is an N-hetero cyclic radical, which N-heterocyclic radical may also include an oxygen or sulfur atom, having a lower-alkyl or lower-alkenyl radical also attached to the heterocyclic N atom. The sum of the carbon atoms in the substituents attached to the quaternary N in the smaller moiety should not be greater than about 7, and, preferably, at least one of said substituents is the methyl radical. The preferred substituents attached to the N-atom of this moiety are three lower-alkyl radicals from the group: methyl, ethyl, n-propyl and isopropyl. Two of these radicals may be joined to form with the N-atom a small heterocyclic radical, such as pyrrolidine, methyl-pyrrolidine and piperidine, and the heterocycle may include an oxygen or sulfur atom, as in the morpholine and thiamorpholine radicals. The smaller ammonium moiety is represented by such preferred examples as: trimethylammonium, methyldiethylammonium, dimethylethylammonium, methyldipropylammonium, dimethylisopropylammonium, methylethylpropylammonium, N-methylpyrrolidinium, N-ethylpyrrolidinium, N-methylpiperidinium, N-methylmorpholinium, N-methylthiamorpholinium and N-methylthiazolidinium. Other examples of the smaller moiety include: triethylammonium, N-ethylpiperidinium, N-propylpyrrolidinium, and N-ethylmorpholinium.

The lower-alkylene bridge between the two quaternary ammonium moieties has at least two and preferably not more than about six carbon atoms therein and can be straight or branched chain. The optimum pharmacological activity appears to reside in physical embodiments of the concept wherein the bridge has three carbon atoms.

The electrostatic charges of the two quaternary ammonium moieties are satisfied by the presence of two anions. The two anions may be the same or different. The precise nature of the anions is not material to the applied utility of the composition constituting the invention, since each anion serves merely to satisfy the electrostatic charge of the nitrogen atom and, since under the conditions of applied use in pharmacodynamic preparations, the quantity of any particular anion is insufficient to exert any significant physiological effect. Representative anions include halogens, sulfates, citrates, tartrates.

The larger moiety of the molecule also is a cationic quaternary ammonium group in which the onium-N atom is substituted by an aralkyl group, said aralkyl group being attached to the N atom through the alkyl portion of the aralkyl group. Said quaternary ammonium group will also be substituted by two lower-alkyl groups, preferably methyl or ethyl. The total radical weight of the aralkyl group should be between about 105 and 320. The aryl portion of the aralkyl group may be a single ring or a fused ring system, and may be unsubstituted or substituted by simple substituents e.g. halo, lower alkyl, lower alkoxy, methylenedioxy, nitro et cetera.

The alkyl portion of the aralkyl group may be straight or branched chain.

An example of an aralkyl meeting the minimum weight requirements is phenethyl, which has a radical weight of 105. A quaternary ammonium moiety in which the onium-N was substituted by a single benzyl group (radical weight—91) is not within the minimum weight requirements for the inventive concept.

Among the aralkyl substituents in the larger quaternary ammonium moiety of the molecule are included, for example: dichlorobenzyl, 4-chlorophenylethyl, 4-chlorophenylmethyl,, 4-bromophenylethyl, 4-bromophenylmethyl, 4-methoxyphenylethyl, 4-methoxyphenylmethyl, 3,4-dimethoxyphenylethyl, 3,4-dimethoxyphenylmethyl, 2,4-dichlorophenylethyl, 2,4-dichlorophenylmethyl, 3,4-methylenedioxyphenylethyl, 3,4-methylenedioxyphenylmethyl, 4-propoxyphenylethyl, 4-propoxyphenylmethyl, 3,4,5-trimethoxyphenylethyl, 3,4,5-trimethoxyphenylmethyl, 4-phenoxyphenylethyl, 4-phenoxyphenylmethyl, 3-indenylethyl, 3-indenylmethyl, 3-methylthiophenylethyl, 3-methylthiophenylmethyl, 4-ethylthiophenylethyl, 4-ethylthiophenylmethyl, 4-cyclohexylthiophenylethyl, 4-cyclohexylthiophenylmethyl, 4-phenylphenylethyl, 4-phenylphenylmethyl, 4-benzoxyphenylethyl, 4-benzoxyphenylmethyl, 4-nitrophenylethyl, 4-nitrophenylmethyl, 1-naphthylethyl, 1-naphthylmethyl, 2-naphthylethyl, 2-naphthylmethyl and also 2-phenyl-1-propyl, 1-phenyl-2-propyl, 1-(3,4-dichlorophenyl)-2-propyl, methylenedioxy, nitro et cetera.

The unsymmetric bis-quaternary salts of the present invention can be prepared by quaternization of an aralkyl-substituted tertiary amine base with an omega-haloalkyl ammonium salt. The tertiary amine base used is that which will provide the larger moiety of the desired end-product molecule. The omega-haloalkyl ammonium salt used is the halo salt of the balance of the desired end-product molecule (i.e., the smaller moiety plus the alkylene bridge portion). Many suitable haloalkyl quaternary ammonium salts are disclosed in our co-pending application Serial 406,052 filed January 25, 1954, which issued December 24, 1957 as U.S. Patent 2,817,664.

Equimolar quantities or an excess of either of the starting reagents may be used, depending on the availability of the starting materials and ease of purification of the product.

The quaternization reaction is usually conducted in the presence of a solvent. Suitable solvents include: acetonitrile; aliphatic alcohols such as ethanol; methanol, isopropyl alcohol, propyl alcohol, isoamyl alcohol; dimethylformamide; nitrobenzene; nitroalkanes such as nitromethane and nitroethane, mixtures of dioxane and an alcohol; and similar polar solvents and solvent mixtures. Or, the reaction may be carried out with a large excess of the starting amine base taking the place of the solvent.

The quaternization reaction may be conducted at temperatures ranging from room temperature to 150 degrees centigrade at atmospheric pressure or in a sealed reaction vessel, with reflux at about 80 degrees centigrade being preferred. In general it is desirable to utilize the lower temperatures of the range to avoid decomposition.

A variation of the above method of preparation which can be used is to prepare the alkylene bis-tertiary amine and to diquaternize it by refluxing with an alkyl halide. It is preferred to use an excess of the alkyl halide over the amount theoretically required. The reaction is preferably performed in the presence of a polar solvent inert under the reaction conditions such as isopropyl alcohol, ethanol, acetonitrile, dimethylformamide, dioxane, et cetera.

The following examples are illustrative of the compounds of the present invention and of the methods whereby they may be prepared, but are not to be construed as limiting:

PREPARATIONS

*Preparation 1.—3,4-Dichlorobenzyldimethylamine*

Into a cold solution of 29.3 grams (0.15 mole) of alpha, 3,4-trichlorotoluene in 200 milliliters of benzene was bubbled 20.3 grams (0.45 mole) of dimethylamine as a precipitate rapidly began to form. After standing at room temperature for 24 hours, the reaction mixture was filtered with suction and the collected precipitate (dimethylamine hydrochloride) washed well with fresh benzene. The combined filtrates were extracted with dilute hydrochloric acid, the aqueous acid solution was made strongly alkaline and extracted with ether. Drying and removal of the ether left an oil which was distilled to yield 26.4 grams (86 percent of the theoretical yield) of 3,4-dichlorobenzyldimethylamine, boiling point 78–80 degrees centigrade at 0.4 millimeters, refractive index $n_D^{25}$ 1.5370.

*Analysis.*—Calculated: N (basic), 6.86. Found: N (basic), 6.85.

*Preparation 2.—2,4-Dichlorobenzyldimethylamine*

Reaction of alpha, 2,4-trichlorotoluene with dimethylamine in a manner similar to that of Preparation 1 afforded 2,4-dichlorobenzyldimethylamine as a colorless liquid, boiling at 93–94 degrees centigrade at 4 millimeters, refractive index $n_D^{24}$ 1.5390.

*Analysis.*—Calculated: N (basic), 6.86. Found: N (basic), 6.82.

*Preparation 3.—3-Dimethylaminopropyldibenzylamine*

A solution of 76.0 grams (0.38 mole) of dibenzylamine and 29.9 grams (0.19 mole) of trimethylene chlorobromide in 50 milliliters of dry dioxane was heated on the steam-bath for 24 hours. The crystalline precipitate of dibenzylamine hydrobromide, 45.0 grams (86 percent of the theoretical yield), melting point 264–265 degrees centigrade, was collected and washed with fresh dioxane. Acidifying the combined filtrate and washings with ethereal hydrogen chloride afforded a precipitate which was washed with ether and crystallized from ethanol to give 5.5 grams of dibenzylamine hydrochloride, melting point 255–257 degrees centigrade, and then, on concentration of the alcohol filtrate to a smaller volume and dilution with ether, there was obtained 14.0 grams (28 percent of the theoretical yield) of 3-chloropropyldibenzylamine hydrochloride as a hygroscopic solid melting at 115–121 degrees centigrade.

*Analysis.*—Calculated: Cl (ionic), 11.43. Found: Cl (ionic), 11.87.

An aqueous solution of 13.7 grams (0.044 mole) of 3-chloropropyldibenzylamine hydrochloride was made alkaline and the organic base dissolved in ether. After drying and removal of the ether the residual oil was dissolved in ethanol, the solution cooled in an ice bath, and into it was bubbled 5.0 grams (0.11 mole) of anhydrous dimethylamine. The solution was heated in a pressure bottle at 75 degrees centigrade for 16 hours. The solvent was removed under reduced pressure, the residue taken up in aqueous sodium hydroxide and extracted with ether. Drying and removal of the ether and distillation of the residue yielded 7.4 grams (63 percent) of dimethylaminopropyldibenzylamine as a pale yellow oil, boiling point 135–136 degrees centigrade at 0.3 millimeters refractive index $n_D^{25}$ 1.5406.

*Analysis.*—Calculated: N, 9.91. Found: N, 9.51.

The dihydrochloride salt melted with decomposition at 221–222 degrees centigrade after recrystallization from ethanol.

*Analysis.*—Calculated: C, 64.21; H, 7.96; Cl, 19.96. Found: C, 64.87; H, 8.05; Cl, 19.89.

*Preparation 4.—3-Dimethylaminopropyltrimethylammonium Bromide*

To a cold solution of 26.0 grams (0.12 mole) of 3-chloropropyltrimethyl ammonium bromide (prepared as described in our co-pending application Serial 531,577) in a mixture of 125 milliliters of isopropyl alcohol and 50 milliliters of dioxane was added 8.5 grams (0.18 mole) of anhydrous sodium carbonate, and into this was then bubbled 6.0 grams (0.13 mole) of anhydrous dimethylamine. The reaction mixture contained in a pressure bottle, was heated with shaking at 75 degrees centigrade for 24 hours. The inorganic salts were filtered off and the filtrate diluted with ether. Recrystallization of the resultant precipitate from isopropyl alcohol yielded 7.7 grams of colorless crystals of 3-dimethylaminopropyltrimethylammonium bromide, melting at 180–182 degrees centigrade.

*Analysis.*—Calculated: N(basic), 6.22. Found: N(basic), 5.60.

A small portion of this, on treatment with hydrobromic acid, afforded 3-dimethylaminopropyltrimethylammonium bromide hydrobromide which melted at 203.5–207 degrees centigrade after recrystallization from tert.-butyl alcohol-ether.

*Analysis.*—Calculated: C, 31.38; H, 7.26; Br, 52.21. Found: C, 30.95; H, 7.27; Br, 52.10.

EXAMPLES

*Example 1.—Trimethylene-1-(3,4-Dichlorobenzyldimethylammonium)-3-(Trimethylammonium) Dibromide*

A solution of 6.1 grams (0.03 mole) of the 3,4-dichlorobenzyldimethylamine described in Preparation 1, and 6.5 grams (0.025 mole) of 3-bromopropyltrimethylammonium bromide in 25 milliliters of acetonitrile was refluxed on a steam-bath for 20 hours. The precipitate was collected and recrystallized three times from isopropyl alcohol to yield 4.7 grams (41 percent of the theoretical yield) of trimethylene-1-(3,4-dichlorobenzyldimethylammonium)-3-(trimethylammonium) dibromide in the form of colorless crystals, melting at 192–195 degrees centigrade with decomposition.

*Analysis.*—Calculated: C, 38.73; H, 5.65; Br. 34.36. Found: C, 39.03; H, 5.56; Br, 33.91.

*Example 2.—Trimethylene-1-(2,4-Dichlorobenzyldimethylammonimum)-3-(Trimethylammonium) Dibromide*

Reaction of 2,4-dichlorobenzyldimethylamine with 3-bromopropyltrimethylammonium bromide following the procedure as described in Example 1 afforded colorless crystals of trimethylene-1-(2,4-dichlorobenzyldimethylammonium)-3 - (trimethylammonium) - dibromide, melting with decomposition at 208–210 degrees centigrade.

*Analysis.*—Calculated: C, 38.73; H, 5.65; Br, 34.36. Found: C, 38.35; H, 5.26; Br, 34.36.

*Example 3.—Trimethylene-1-(1-Naphthylmethyl-Dimethylammonium)-3-(Trimethylammonium) Dibromide*

A solution of 6.5 grams (0.035 mole) of 1-naphthylmethyldimethylamine and 7.8 grams (0.03 mole) of 3-bromopropyltrimethylammonium bromide in acetonitrile was refluxed on a steam-bath for 15 hours. The precipitate was collected and recrystallized four times from isopropyl alcohol-ethyl acetate to yield 6.3 grams (47 percent of the theoretical yield) of trimethylene-1-(1-naphthylmethyldimethylammonium) - 3 - (trimethylammonium) dibromide as colorless crystals, melting at 205–307 degrees centigrade.

*Analysis.*—Calculated: Br, 35.81. Found: Br, 35.76.

*Example 4.—Trimethylene-1-(Phenylethyldimethylammonium)-3-(Trimethylammonium) Dibromide*

Reaction of phenylethyldimethylamine with 3-bromopropyltrimethylammonium bromide following the procedure described in Example 1 afforded trimethylene-1-(phenylethyldimethylammonium) - 3 - (trimethylammonium dibromide, as a solid melting with decomposition at 188 degrees centigrade after several recrystallizations from isopropyl alcohol.

*Analysis.*—Calculated: C, 46.83; H, 7.38; Br, 38.96. Found: C. 46.54; H, 7.40, Br, 39.22.

*Example 5.—Trimethylene-1-(Phenylethyldiethylammonium)-3-(Trimethylammonium) Dibromide*

Reaction of phenylethyldiethyl amine with 3-bromo propyltrimethylammonium bromide following the procedure described in Example 1 afforded trimethylene-1-(phenylethyldiethylammonium) - 3 - (trimethylammonium) dibromide, as a solid melting with gas evolution at 161–163 degrees centigrade after recrystallization from ethanol and ether.

*Analysis.*—Calculated: C. 49.32; H, 7.83; Br, 36.46. Found: C. 48.79; H, 7.93; Br, 36.76.

*Example 6.—Trimethylene-1-(-1Naphthylmethyldiethylammonium)-3-(Trimethylammonium) Dibromide*

Reaction of 1-naphthylmethyldiethylamine with 3-bromopropyltrimethylammonium bromide following the procedure described in Example 3 provided trimethylene-1-(1-naphthylmethyldiethylammonium) - 3 - (trimethylammonium) dibromide.

*Example 7.—Trimethylene-1-(3,4-Dichlorophenylethyldimethyl ammonium)-3-(trimethylammonium) Dibromide*

Reaction of 3,4-dichlorophenylethyldimethylamine with 3-bromopropyltrimethylammonium bromide, following the procedure of Example 1, afforded trimethylene-1-(3,4-dichlorophenylethyldimethylammonium) - 3 - (trimethylammonium) dibromide as a crystalline solid, melting with decomposition above 110° C.

*Analysis.*—Calculated: C, 40.11; H, 5.88; Br, 33.30. Found: C, 40.16; H, 5.74; Br, 32.52.

*Example 8.—Trimethylene-1-[1-(3,4-Dichlorophenyl)-2-Propyldimethylammonium] - 3 - (Trimethylammonium) Dibromide*

Similarly to Example 11, but using 1-(3,4-dichlorophenyl)-2-propyldimethylamine, the product trimethylene-1-[1(3,4-dichlorophenyl) - 2 - propyldimethylammonium]-3-(trimethylammonium) dibromide was obtained.

*Example 9.—Trimethylene-1-(1 - Naphthylethyldimethylammonium)-3-(Trimethylammonium) Dibromide*

Following the procedure of Example 1, but using 1-naphthylethyldimethylamine, the product trimethylene-1-(1-naphthylethyldimethylammonium) - 3 - (trimethylammonium) dibromide was obtained.

*Example 10.—Trimethylene-1-(3-Indenylethyldimethylammonium)-3-(Trimethylammonium) Dibromide*

Following the procedure of Example 1, but using 3-indenylethyldimethylamine, there was obtained trimethylene-1-(3-indenylethyldimethylammonium)-3 - (trimethylammonium) dibromide.

*Example 11.—Trimethylene-1-(4 Propoxyphenylethyldimethylammonium)-3-(Trimethylammonium) Dibromide*

As in Example 1, 4-propoxyphenylethyldimethylamine was reacted with 3-bromopropyltrimethylammonium bromide to yield trimethylene-1-(4-propoxyphenylethyldimethylammonium)-3-(trimethylammonium) dibromide.

The following pharmacological data on typical compounds of the present invention is representative and illustrative of the pharmacological activity of the compounds of the present invention.

I. Hypotensive effects in anesthetized dogs (following standard test procedure)

| Compound of Example Number | Dose (mg. per kg. I. V.) | Percent Blood Pressure Fall | Duration (hours) |
|---|---|---|---|
| 2 | 0.05 | 10 | 0.2 |
|   | 0.10 | 50 | >2.5 |
|   | 0.25 | 50 | 3 |
| 1 | 0.50 | 50–80 | >3 |
|   | 0.10 | 40 | 0.75 |
|   | 0.20 | 45 | 1.0 |
| 3 | 0.05 | --- | --- |
|   | 0.10 | 45 | 1.0 |
| 5 | 0.5 | 35 | 0.5 |
|   | 1.0 | 40 | 0.5 |
|   | 2.0 | 55 | 2.0 |
| 4 | 0.025 | --- | --- |
|   | 0.05 | 50 | >4 (slow) |
|   | 0.1 | 50 | >3 |

II. Acute toxicity—mice, mg./kg. (by procedure of B. Behrens and G. Karber published in the Archives for Experimental Pathology and Pharmacology, 177 page 379 [1934]).

Compound of Example:  I. V. LD$_{50}$
2 -------------------------------------------- 72
1 -------------------------------------------- 67
3 -------------------------------------------- 47
5 -------------------------------------------- 63
4 -------------------------------------------- 112

III. Ganglionic Blockage—cats, superior cervical ganglion (by procedure of G. H. Acheson and S. A. Pereira, published in the Journal of Pharmacology and Experimental Therapeutics, 87 page 273 [1946]).

| Compound of Example Number | Dose (mg. per kg), I. V. | Degree (0–4+) | Duration (hours) |
|---|---|---|---|
| 2 | 0.05 | − | --- |
|   | 0.1 | + | 0.5 |
|   | 0.25 | ++ | 0.8 |
|   | 0.5 | ++++ | ? |
| 1 | 0.25 | − | --- |
|   | 0.5 | + | 0.2 |
|   | 1.0 | +++ | 1.25 |
| 3 | 0.1 | − | --- |
|   | 0.25 | + | 0.4 |
|   | 0.5 | ++ | >0.5 |
|   | 1.0 | ++ | >1.5 |

IV. In Vitro antispasmodic activity on isolated muscle strips by the method of Magnus published in Arch. ges. Physiol, 102:123 (1904).

| Compound of Example Number | Mg. Percent | Percent Inhibition |
|---|---|---|
| 2 | 0.01 | 15 |
|   | 0.1 | 10 |
|   | 1.0 | 25 |
|   | 10.0 | 80 |
| 1 | 0.01 | 15 |
|   | 0.1 | 10 |
|   | 1.0 | 15 |
|   | 10.0 | 85 |
| 3 | 0.01 | 0 |
|   | 0.1 | 5 |
|   | 1.0 | 25 |
|   | 10.0 | 85 |

The compounds of the present invention are administered clinically by injection in isotonic solution and also by the oral route.

It is to be understood that the invention is not to be limited to the exact details of operation and exact compounds shown and described, as obvious modifications and equivalents will be apparent to one skilled in the art, and the invention is therefore to be limited only by the scope of the appended claims.

We claim:
1.

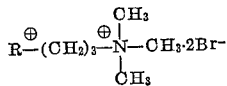

wherein R is a member selected from the group consisting of 3,4-dichlorobenzyldimethylammonium, 2,4-dichlorobenzyldimethylammonium, naphthylmethyldimethylammonium, phenylethyldimethylammonium, phenylethyldiethylammonium, naphthylmethyldiethylammonium, 3,4-dichlorophenylethyldimethylammonium, 3,4-dichlorophenyl - 2 - propyldimethylammonium, naphthylethyldimethylammonium, 3 - indenylethyldimethylammonium, and 4-propoxyphenylethyldimethylammonium.

2. Trimethylene - 1 - (3,4 - dichlorobenzyldimethylammonium) - 3 - (trimethylammonium) dibromide.

3. Trimethylene - 1 - (3,4 - dichlorophenylethyldimethylammonium) - 3 - (trimethylammonium) dibromide.

4. Trimethylene - 1 - (1 - naphthylmethyldimethylammonium) - 3 - (trimethylammonium) dibromide.

5. Trimethylene - 1 - (phenylethyldiethylammonium)- 3 - (trimethylammonium) dibromide.

6. Trimethylene - 1 - (phenylethyldimethylammonium) - 3 - (trimethylammonium) dibromide.

References Cited in the file of this patent
UNITED STATES PATENTS
2,813,904    Lott _____ Nov. 19, 1957

OTHER REFERENCES
Adams et al.: Nature, vol. 177, pp. 523–524 (March 17, 1956).